United States Patent

Waldmann

[19]

[11] Patent Number: 6,136,200
[45] Date of Patent: Oct. 24, 2000

[54] TREATMENT FOR PAINT AND LACQUER WASTE WATER

[75] Inventor: John J. Waldmann, Charlotte, N.C.

[73] Assignee: Polymer Research Corporation, Charlotte, N.C.

[21] Appl. No.: 08/208,593

[22] Filed: Mar. 11, 1994

Related U.S. Application Data

[62] Division of application No. 08/047,624, Apr. 15, 1993, Pat. No. 5,294,352, which is a continuation of application No. 07/763,880, Sep. 20, 1991, abandoned, which is a continuation of application No. 07/409,396, Sep. 19, 1989, abandoned, which is a continuation-in-part of application No. 07/096,681, Sep. 15, 1987, abandoned, and a continuation-in-part of application No. 06/749,343, Jun. 27, 1985, Pat. No. 4,891,422.

[51] Int. Cl.$^7$ ..................................................... B01D 21/01
[52] U.S. Cl. ........................... 210/725; 210/696; 210/698; 210/720; 210/721; 210/723; 210/727; 210/728; 210/732; 210/733; 210/736; 55/85; 55/89; 528/9; 528/230; 528/245; 528/246; 528/247; 528/248; 528/254; 528/256; 528/257; 528/258; 528/264; 528/266; 528/268; 528/423; 524/81; 524/174; 524/176; 524/204; 524/270; 524/271; 524/183; 524/188; 524/261; 524/401; 524/432; 524/433; 524/437; 524/443; 524/444; 525/54.2; 525/54.42; 525/54.5; 525/63; 525/76; 525/78; 525/88; 525/248; 525/249; 525/259; 525/294; 525/472; 525/473; 525/509; 525/515; 525/518; 134/38
[58] Field of Search ..................................... 210/725, 728, 210/727, 696, 698, 720, 721, 723, 732, 733, 736; 55/85, 89; 528/9, 230, 245, 246, 247, 248, 254, 256, 257, 258, 264, 266, 268, 423; 524/81, 174, 176, 204, 270, 271, 183, 188, 261, 401, 432, 433, 437, 443, 444; 525/54.2, 54.42, 54.5, 63, 76, 78, 88; 248, 249, 259, 294, 472, 473, 509, 515, 518; 134/38

[56] References Cited

U.S. PATENT DOCUMENTS 4,067,806   1/1978   Mauceri ..................................... 210/52
4,637,824   1/1987   Pominville ............................... 210/725

*Primary Examiner*—Samuel A. Acquah
*Attorney, Agent, or Firm*—Isaac Angres; Susan Petraglia

[57] ABSTRACT

A composition for the detackification and clarification of acid and alkaline paint and lacquer waste waters and paint spray booth wastes, comprising:

an inorganic-organic and/or organic adduct alloy polymer composition having the formula:

$$A \cdot B^+ \cdot D^+$$

wherein: $A=[(SiO_2/Me^I_2O)_u Me^{II}_m Me_m^{III(OH)}{}_p {}^{(SO_4)}{}_y {}^{(Aci)}(2m+3n)-p-2y]_r$ where r=1 to 98% bw; u=0 to 10% bw;

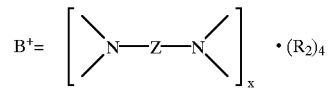

where: x=0 to 98% bw; Z is a divalent substituted or unsubstituted aliphatic, cycloaliphatic, heterocyclic or aromatic radical $D^+=(PQAM)_w$ where w=2 to 98% b.w. of polyquaternized polymer (PQAM)
$Me_m^{II}$ is selected from the divalent cationic group comprising: Mg, Zn, Ca, and $Fe^{2+}$
m=0 to 5
$Me_n^{III}$ is a tri-or more valent metal selected from the group comprising: Fe, Al, and Al—Zn complexes;
n=1 to 20

Aci is selected from the monovalent anionic group comprising $Cl^-$, $Br^-$, $I^-$, $NO_3$—, $H_2PO_4$—, $CH_3COO^-$, $OH^-$ or a mixture of two or more of the foregoing, but preferably Aci is $Cl^-$, $NO_3$—, $CH_3COO^-$, or $H_2PO_4$—;

MeI=Na, K, Li, Cs
p=0 to 75
y=0 to 15

The method of manufacturing such compositions is also disclosed.

16 Claims, No Drawings

TREATMENT FOR PAINT AND LACQUER WASTE WATER

CROSS-REFERENCE TO RELATED APPLICATION

This application is a divisional of pending application Ser. No. 08/047,624, filed Apr. 15, 1993, now U.S. Pat. No. 5,294,352 which is a continuation of Ser. No. 07/763,880 filed Sep. 20, 1991 now abandoned, which is a continuation of Ser. No. 07/409,396 filed Sep. 19, 1989 now abandoned, which is a CIP of Ser. No. 07/096,681 filed Sep. 15, 1987 now abandoned and CIP of Ser. No. 06/749,343 filed Jun. 27, 1985 now U.S. Pat. No. 4,891,422.

BACKGROUND OF THE INVENTION

Industrial waste water as well water-borne waste and paints derived from industrial processes such as electrophoretic and spray-booth painting can cause serious pollution problems. Water-born paints, and waste water when discharged as aqueous carrier with paint or lacquer residues, increase substantially the chemical oxygen demand (COD). Such paint and lacquer deteriorate by ageing or chemical modification, become sticky or hard, resulting in pipe and equipment blockage which are extremely difficult to clear.

In addition to the prior art disclosed in U.S. patent application Ser. No. 842,515, filed on Mar. 21, 1986, the following prior art patents are related to the subject matter of this application:

U.S. Pat. No. 4,067,806 of Frank A. Mauceri discloses a process of detackification of paint and spray booth lacquer by using amphoteric salts (like zinc chloride etc.) and a terpolymer-"graft"-on diallyldimethylammonium halide, N-vinylpyrrolidone and acrylamide. The compositions have tremendous disadvantage by using amphoteric salts like $ZnCl_2$, which will form zinc hydroxide only at high pH of 10 to 10.5. Below and above this pH range, the zinc hydroxide is soluble again, so the floc forms. On the other hand, the zinc hydroxide is very fluffy and unstable, and absorbs much water which makes the products very unsecure in this kind of application. The waste water and the sludges are alkaline and can not be discharged without further treatment, which makes such processes uneconomical. Further, under the conditions described in the patent, the amphoteric salt ($ZnCl_2$) can easily be transformed into inactive anion like $ZnCl_3^-$ by the reaction:

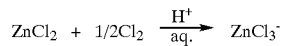

$$ZnCl_2 + 1/2Cl_2 \xrightarrow[aq.]{H^+} ZnCl_3^-$$

which decreases the efficiency to treat and/or kill the anodic and/or cathodic paints, lacquer, etc.

U.S. Pat. No. 3,990,986 of Gabel, et al, like Mauceri, teaches detackification of the paint and lacquer by using amphoteric salts (like $ZnCl_2$) or a blend with alkanolamines and/or aliphatic amino alcohols. This patent presents the same negative aspects as Mauceri. Note also that the test conditions of detackification use an insufficient amount of paint (0.5 cc/500 mls of water) for a fair test. The product selected, such as polyalkylene oxide with molecular weight (Mw) of 200 has low Tg (glass transition temperature) which makes the reaction hydrophilic, resulting in very unsecure floc, and the paint may be only partially killed.

U.S. Pat. No. 4,401,574 of Farrington, et al, uses polyaluminum chloride (PAC) in paint waste water, such as polyvinylacetate latex based paint or vinyl-acrylic paint. The (PAC) alone or mixed with regular aluminum and/or iron salts (chloride, sulfate) are totally ineffective on air-borne paint and lacquer waste water treatment. Even in regular paint waste water, the water clarity (35 NTU) is still hazy.

U.S. Pat. No. 4,182,839 of Tesson discloses the process of manufacturing cationic resin soluble in water, based on melamine formaldehyde-alkyl and/or alkanolamine-hydrochloric acid. The products are used in the paper industry, to develop resistance of paper to humid conditions.

U.S. Pat. No. 3,645,841 of Jean A. Cabestany et al discloses a process of producing cationic quaternized resin by reacting melamine-formaldehyde-dimethyl sulfate. The products are used in paper industry applications.

Electrophoretic paints consist of an organic substrate on which ionic charges have been introduced. Today's market can offer anodic electropaints or a cathodic formulation. For more than twenty years, the method of treatment has been to add a chemical coagulant (either ferric or aluminum salts) in a controlled pH environment to form a hydrous oxide floc onto which that paint can be adsorbed. The anodic paints become sticky if they encounter acid conditions and cathodic paints become sticky in alkaline conditions. Application of solvent-based paints by spraying, followed by a hardening stage is extensively practiced for motor car body finishes over the electropaint primer. The spraying is carried out in a booth with exhaust system to extract surplus air-borne paints. Any removed material passes through a curtain of recirculating water, which will absorb paint and solvent, and which has to be removed before the waste water is recirculated.

The most common paints used are classified into two groups:

a. Spray-booth paints such as thermosetting acrylic clearcoat, thermosetting acrylic enamel, thermoplastic acrylic lacquer and stoving alkyd.

b. Electophoretic paints such as acrylic based anodic, epoxy-based cathodic and polybutadiene based anodic.

Other paint-varnish systems which may be used are:

1. Epoxy, such as pre-polymerized epoxy resin, amide-epoxy (crosslinked copolymers).
2. Styrenated alkyd
3. Drying oils
4. Phenolic resin
5. Urea alkyd
7. Urea melamine
7. Silicone The treatment system commonly used is controlled additions of coagulants with simultaneous pH control which are removed by air flotation, electroflotation or sedimentation, slurryholding and filter press. In the case of air flotation, full chemical coagulant with good performance is still to be achieved. the regular ferric or aluminum sulfate, though largely unsuccessful for coagulation processes, are used as paint "killer". The industrial waste water and water-borne paints treated with the inorganic-organic and/or organic alloy polymer adducts have a high impact on coagulation processes. These act as primary coagulants which under neutralization processes (preferable "hydrophobe" compositions) will floc and kill the paint. Good performance was produced with an operating pH of 6.0 to 9.0 for anodic and cathodic paint which gives high supernatant clarity and high settling and/or dewatering rates. As pH can be used any reagents, or alkaline inorganic and/or organic matter but preferable are the hydrophobe alkaline agents. For the preparation of "hydrophobe" alkaline material, the following can be used:

a. Any inorganic and/or organic alkaline matter such as NaOH, KOH, Ca(OH), sodium aluminate, potassium aluminate, sodium zincate, sodium silicate and/or metasilicate, sodium borate, alkyl amines, alkanol amines or mixture of these in combination with "hydrophobe" materials.

b. (Co)polymers, surfactants (preferably nonionics and/or anionics and/or mixture of these from 0.5% b.w.–95.5% b.w.–0.5% b.w.). The most preferable hydrophobe product are the (co) polymers such as cationic polyamines or copolymers, or vinyl latex type as ethylenicaly, styrene latex, styrene-divinylbenzene latex, styrene butadiene (modified) latex, styrene acrylates and/or acrylic latex, acrylates and/or natural polymers type.

c. Hydroxy alkyl(poly)carboxylate salts and/or acids such as sodium gluconate, sodium gluco heptonate, modified natural (co)polymers salts, sodium rosinates, sodium glucosides and/or other cation combinations, clay and bentonite modified inorganic and/or organic type including cationic types.

d. Other products used can be in any forms as inorganic/ or organic alkaline stripper agents including halogenated types and/ or in combination with products (a), (b) and/or (c).

For air and/or electroflotation, NaOH is the most commonly used, producing as well as hydrophobe agents in some cases, less dense and easily floated flocs. For anodic paint treatment, alkali dosage can be used before the coagulation addition, therefore the final pH is approached from the high pH end.

Polyelectrolyte selection is very important too. These must have very high molecular weight (Mw). In the case of water-borne paint waste water, a dosage of less than 1.0 ppm often improved supernatant clarity and fast settlement. Higher concentrations may tend to produce bulky, open-textured flocs.

SUMMARY OF THE INVENTION

The treatment with inorganic-organic alloy adduct polymers and/or organic alloy-adduct polymers involved denaturation of the surface or dispersed matter and of semidispersed paint globules in combination with hydrophobic alkaline or alkaine matter. This treatment is sufficient to render the paint globules relatively "non-sticky" and it allows them to be skimmed from the surface of the treatment solution into filter bags. The sludges produced by the selected products have low water content, and dewater much faster than any combination used in the prior art. The clarified effluent can then be re-cycled to the spray-booth.

The polyelectrolyte is added (if required) in a uniform manner and at one or several distribution points by gentle mixing. Because the water has high electrolyte content, most of the time the flocculation process does not occur completely, therefore several feeding points should be selected. In many cases, it may be noticed that partial flocculation may occur followed by converting into thickening material which may produc very gummy and sticky floc.

On the other hand, when calcium, magnesium hydroxide is used, resulting floc is more compact, and sludge is faster-setting. NaOH is the choice for producing less dense and more easily floated flocs. It was found that by using $Al^{3+}$ or $Fe^{3+}$ (either as chloride or sulfate polychloride or polysulfate types) or as mixture anions, a regular coagulant can not produce satisfactory results at all. The floc formed is tacky, "unkilled", bulky, and produces turbid water. Most of the systems proposed today use very high pH, such as ph 10 to 14. U.S. Pat. No. 3,990,986 even suggests a dosage up to 100,000 ppm. Any system with such high pH treatment and amphoteric salts produces other problems which require additional treatment for sludges and waste water. The alkaline sludge can not be disposable or incinerated and the alkaline water and high suspended matter can not be discharged. In contrast with existing technologies, the organic-inorganic alloy polymers and/or organic alloy polymer compositions selected require much lower treatment dosage (5 to 7000 ppm), depending on the paint nature. If a mixture of paint characters are treated, the normal pH of 7 to 9 is suitable for effective treatment. The products are not corrosive, and the killed paint flocs can be easily handled by other plant operations.

For these products, the most useful are the quaternary ammonium polymers which can be prepared by:

1. Quaternization of a monomeric compound, e.g. a vinyl monomer or epoxide, and subsequent polymerization.
2. Quaternization of tertiary amine with halogenated polymer.
3. One-step spontaneous polymerization of unsaturated tertiary amine (e.g. vinyl pyridine) with alkylating agents.
4. Quaternization of polyamine with alkyl halide.
5. Polymerization of di(tertiary amine) and alkylene dichloride to form (poly)ionenes or polymerization of chloroalkyl tertiary amine to form (poly)ionenes.
6. Post reaction of polymer containing suitable reactive functional groups with quaternary ammonium compounds.

In the case of inorganic-organic adduct polymers which are multianions, they can display the monoactivity charges of (Cl—) or (½SO$_4$2-) by multivalent metal anion system generating more active flocculants and/or coagulants. For instance, if an inorganic adduct polymer such as aluminum hydroxy sulfate is reacted with polydiallyldimethyl ammoniumchloride, the chlorine anionic (Cl—) will be displaced by the multianion, such as:

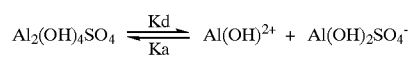

where the dissociation constant (Kd) is greater than association constant (Ka):

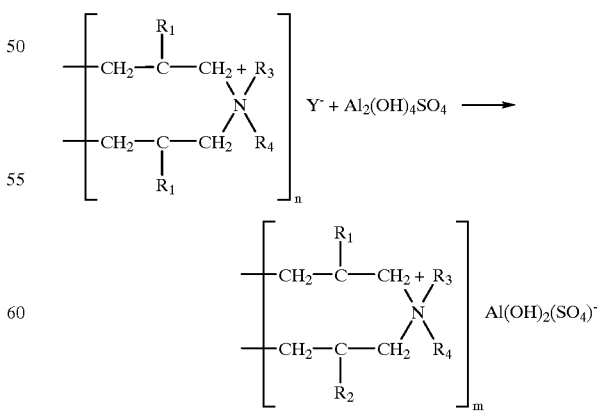

where $R_1$ and $R_2$ represent hydrogen, methyl and ethyl radicals, $R_3$ and $R_4$ each represent alkyl, alkoxyalkyl, hydroxyalkyl radicals having one to eight (1 to 8) carbon atoms, and (Y—) represents an anion and 2 complex anions, such as methosulfate, ethosulfate, chlorine, bromine and iodine.

The synthesis can be carried out from room temperature (RT) to 175° C. and from normal pressure to 0.2 to 25 Kg /cm$^2$. Some details of these preparations are described in U.S. patent application Ser. No. 842,515, filed in Mar. 21, 1986, which is incorporated herein by reference.

The invented products based on inorganic-organic polymer adduct alloys, inorganic-organic polymer adduct alloys—surfactants and/or humectants, or organic polymer adduct alloys—surfactants and/or humectants composition are high performing, highly effective, products for any waste water treatment of water-borne waste including paints and lacquers. The inorganic-organic polymer adduct alloy can be produced in full yield having a viscosity less than 20,000 cps as water soluble with or without special wetting agents or surfactants, such as alcohols, hydroxy-alcohols, glycols, polyglycols, aprotic solvents like: dimethylsulfoxide, ketones, lactones, alkyl and alkyloxy phosphonate/or polyphosphonates (called humectants), salts such as sodium hydrogen sulfate, ammonium and sodium citrate which can vary from 0% to 45% by weight. The most suitable surfactants for this application are:

|     |                                                                                                                    |
| --- | ------------------------------------------------------------------------------------------------------------------ |
| I   | Anionics                                                                                                           |
| II  | Nonionics                                                                                                          |
| III | Cationics                                                                                                          |
| IV  | Zwitterionics                                                                                                      |
| V   | N-Lauryl sarcoside                                                                                                 |
| VI  | Linear alkylbenzene sulfonate                                                                                      |
| VII | Higher alkylbenzene sulfonate                                                                                      |
| VIII| Linear sulfonate                                                                                                   |
| IX  | Petroleum sulfonate                                                                                                |
| X   | N-Aryl-n-alkyllaurate                                                                                              |
| XI  | Parafin sulfonate (S A S)                                                                                          |
| XII | L-Olefin sulfonates (A O S)                                                                                        |
| XIII| Alkylnaphthalene sulfonates                                                                                        |
| XV  | Sulfated linear alkyl alcohols                                                                                     |
| XVI | Sulfated polyoxyethylenated straight chain alcohols                                                                |
| XVII| Sulf(on)ated oils                                                                                                  |
| XVIII| Phosphoric and polyphosphoric acid, esters, polyoxyacids disubstituted phosphonates - in monomeric or polymeric forms |
| XIX | Quaternary ammonium salts                                                                                          |
| XX  | Amine oxide                                                                                                        |
| XXI | Polyoyethylated long-chain amines and the quaternized products                                                     |
| XXII| Polyoxyethylenated straight-chain alcohols, alcohol ethoxylates                                                    |
| XXIII| Sulfated linear alkyl alcohols ethoxylated (E0)$_{1-60}$                                                          |
| XXIV| Sulfated polyoxyethylenated straight-chain alcohols                                                                |
| XXV | Sulf(on)ated oils and their blends                                                                                 |
| XXVI| Phosphoric and polyphosphoric acid esters, di-substituted phosphonated of polyalkyloxyacids in a monomeric or polymeric forms |
| XXVII| Quaternary ammonium salts, N-alkyltrimethylammonium chloride, N,N-dialkyldimthylammonium chloride benzyl-(alkyl)$_{1-3}$ ammonium chloride (1-3 = mono, di and tri) |
| XXVIII| Amine oxide copolymers                                                                                           |
| XXIX| Polyoxyethylated long-chain amines and quaternized products                                                        |
| XXX | Polyoxyethylenated polyoxypropylene glycol                                                                         |
| XXXI| Polyoxyethylenated mercaptans                                                                                      |
| XXXII| Quaternary ammonium benzosulfamides                                                                               |
| XXXIII| Ethoxylate of oligosaccharides                                                                                   |
| XXXIV| Mixture of anionics-nonionic from 0.5–95% bw, or cationics-nonionic from 0.505–95% bw, and/or anionics; cationics or nonionic from 0.5% bw to 99.5% bw. |

The products are stable, low cost, and contribute greatly to eliminating the water and air pollution caused by the paint, auto, chemical and furniture industries.

DETAILED DESCRIPTION

The invented chemical compositions are inorganic-organic alloy polymer adduct compositions and/or organic alloy polymer adducts compositions for water-borne waste and lacquer paint treatment, having the formula:

(A)

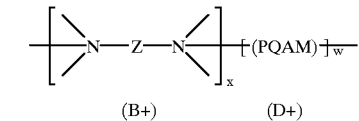

(B+)         (D+)

as described.

Component A

The novel (co)polymer alloy of inorganic polymers (A) is defined by any of the following general formulas, I(a) through I(g):

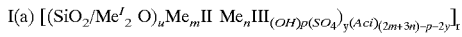

wherein: $(SiO_2/\text{Me}^I{}_2O)_u$=1.5 to 3.5 ratio, u=0 to 10% and Me$^I$=Na,K,Li,Cs SiO$_2$=sodium silicate, sodium metasilicate or mixture thereof:

r=1% to 98% ; p=0 to 75; y=0 to 15

Me$^{II}$ is a divalent cation selected from the group comprising: Mg, Zn, Ca, Fe $_2$+; and m to=0 to 5

Me$_n{}^{III}$ is a tri- or more valent metal, preferably Fe,Al, or Al-Zr complexes; and n=1 to 20

Aci is selected from monovalent anionic group comprising: (a) Cl—, (b) Br—, (c)I—, (d) NO$_3$—, (e) CH$_3$COO—, (f) H$_2$Po$_4$—,(g) OH$^-$ or (h) a mixture of two or more of the foregoing, but preferably Aci is Cl—.

These products may be prepared by a variety of processes as described in U.S. patent application Ser. No. 646,012, filed Aug. 31, 1984.

I (b): Al$_m$(OH)$_n$X$_{3m-n-2k}$(SO$_4$)$_k$ wherein: X is sodium or potassium aluminate, or NO$^-{}_3$, or Cl$^-$ k, m, n are positive numbers.

I (c): Al$_{1-x}$Fe$_x$III Fe$_y$II (OH)$_{3+2y-2}$(Ha1)$_z$ wherein: Ha1 =chlorine, bromine, iodine or a mixture thereof:

(x+y)/(1-x)=about 0.2 to 1.5. z<3+2y, and (3+2y-2)/(3+2y)=about 0.24 to 0.67

I (d): Al$_m$(OH)$_x$(SO$_4$)y (H$_2$PO$_4$)$_z$ wherein: the sum of x+2y+2 is 3;

m and x are positive integers;

y is 0 or a positive integer; and z is 0 or a positive integer.

I (e): Me$_n$(OH)$_m$ X$_{3n-m}$ wherein: m, n are positive integers.

Me is a tri- or more valent metal, and X is Cl—, CH$_3$COO—, or NO$_3$.$^-$ or OH$^-$ I (f): Regular salts of aluminum, iron, titanium, vanadium, chromium, antimony such as chloride, sulfates, phosphates, nitrates, acetates or mixture thereof, sodium and/or potassium silicate, magnesium and/or calcium silicate, aluminum magnesium silicate, sodium, metasiliicate, bentonite and/or cationic bentonite, organic cationic modified bentonite or mixture thereof.

Inorganic adduct polymer, as the term is used in this specification includes, without limitation:

1. Polyhydroxyaluminumchloride; $Al_4(OH)_9(Cl)_3$, or $Al_8(OH)_2(Cl)_3$, or $Al_{11}(H)_{30}(Cl)_3$.
2. Hydroxyaluminumchloride: $Al_2(OH)_5Cl$ as Chlorhydrol TR-50, Astrigen TR-50
3. Polyhydroxyaluminumagnesiumchloride: $Al_3Mg(OH)_9(Cl)_2$;
4. Polyhydroxyaluminumcalciumchloride: $Al_7Ca_{0.04}(OH)_{17.01}(Cl)_4$;
5. Polyhydroxyaluminumagnesiumsulfate: $Al_4Mg(OH)_4(SO_4)3.5$;
6. Hydroxyaluminumsulfate: $Al_2(OH)_4SO_4$ ;
7. Polyaluminumsulfate: (PAS) $Al_2 (OH)_2 (SO_4)_2$
8. Polyhydroxyaluminumzincoxidechloride: $Al_3(OH)_3ZnO(OH) (Cl)_5$;
9. Polyhydroxyaluminum and/or magnesiumchlorosulfate: $Al_4(OH)_6(Cl)_4(SO_4)$ or $Al_3Mg(OH)_6(Cl)_3(SO)$;
10. Polyaluminumferric and/or ferrous chloride: $Al_2Fe_2(OH)_{3.32}(Cl)_{6.68}$ or $Al\, Fe_{0.25}{}^{II} Fe_{0.25}{}^{III}(OH)_{2.12} (Cl)$;
11. Polyaluminumchloride sulfate, and
12. Polyhydroxyaluminumchlorosilicate.
13. Aluminumzirconium (penta or tetra) chlorohydrate: $Al_8Zr(OH)_{23}Cl_5$ or $Al_4Zr(OH)_{12}Cl_4$, etc.

Component B+:

The B+ component has the formula [>N—Z—N<]x wherein Z is a divalent radical such as optionally organic substituted aliphatic; cycloaliphatic, heterocyclic or aromatic radical and x is from 0% to 95% by weight of total alloy compositions and the component (B+) of the composition is selected from polyalkylamines, polyetherpolyamines, polyethylenepolyamine(s), N-substituted ethyleneimines, polyquaternary compounds, 1, 3, -bisquaternaryammonium compounds, polyquaternaryalkylamine, polydiaziridinyl compounds, epihalohydrin with aqueous mixture of major amount of a secondary alkylamines and minor amount of a primary alkylamine, polyionenes, a quaternized of polyamine with alkylhalide and quaternized of tertiary amine with halogenated polymer, polyamine having a molecular weight from 200 to 500,000, and other high nitrogen content resinous and or (co)polymers products such as guanidine, arylguanidine and/or cyanoguanidine, cyanoguanidine-melamine, melamine-formaldehyde, melamine-glyoxal, melamine-urea-formaldehyde, melamine-alkylamine-urea-formaldehyde, melamine formaldehyde-sulfite/or bisulfite salt, amino-azines which may be employed include aminotriazines, mixture of carbamides and/or amino-azines which may be used are: melamine, melam, ammeline, thioammeline and substituted ammeline, aminodiazines, mixture of carbamides and/or amino-azines which may be used include for example urea and melamines, melamine and cyanoguanidine, melamine and thioammeline; urea, melamine and 2,6-1,3-diazine and similar mixture; cyanamide, dicyandiamide, guanidine and alkylaryl, and aralkyl-substituted urea in condensation with aldehydes such as glyoxal but not limited. Aldehydes which may employed include formaldehyde and/or paraformaldehyde, acetaldehyde, benzaldehyde, butyraldehyde, furfurylaldehyde, glyoxal and mixtures of two or more aldehydes, such as formaldehyde and paraformaldehyde; formaldehyde and acetaldehyde and benzaldehyde; acetaldehyde and furfurylaldehyde formaldehyde, benzaldehyde and furfurylaldehyde and the like. Other aminoplast resin and/or aminoplast cationic resins which may be employed include melamine-formaldehyde and/or paraformaldehyde; melamine-formaldehyde-glyoxal melamine-urea and/or thiourea formaldehyde; melamine guanidine and/or cyanoguanidine-formaldehyde, [melamine-formaldehyde and/or melamine-formaldehyde-glyoxal; melamine-urea-formaldehyde and/or melamine-guanidine/or cynoguanidine-formaldehydel protonized with mineral acid and/or organic acid such as hydrochloric, nitric, phosphoric, sulfuric, formic, acetic, glycolic, lactic, citric, propionic, butyric, oxalic, maleic, glutaric acids or a mixture of those. The melamine-glyoxal-sulfuric acid, and/or sulfuric-hydrochloric acid mixture, hydrochloric-formic acid mixture are unknown resins. The protonized resins that may be employed include the following molarity:

| | |
|---|---|
| Melamine | 0.15 to 2.05 Moles |
| (Cyano) guanidine | 0.0 to 3.33 Moles |
| Formaldehyde | 0.0 to 15.0 Moles |
| Polyamine/or Aliphatic amine and/or Alkanolamines | 0.0 to 5.0 Moles |
| Glyoxal | 0.5 to 5.0 Moles |
| Mineral acids and/or organic acid | 0.0 to 5.0 Moles |
| Quaternization agents as alkyl halide, dialkylsulfates, halo benzyl and/or arylsulfonic acid | 0.0 to 3.34 Moles |
| Organic acids | 0.0 to 5.0 Moles |

Other aminoplast resins which may be employed are:

a. Polyamine-modified urea-formaldehyde resins and b. Melamine-formaldehyde resins, c. Any suitable polyamine and/or polyarylamide modifier can be used in the modified urea-formaldehyde resins such as, without limit: cyanoguanidine-diethylene triamine-melamine; reaction product of about one (1) Mole cyan three (3) Moles of formaldehyde and from about one (1) Mole of urea, per mole of said cyanogu reaction product of about 0.9 Mole of cyanoguanidine, about Mole of melamine, about three Moles of formaldehyde and from about 0.5 Mole to about one Mole of urea per Mole of said cyanoguanidine and melamine produced and the mixture of said resins one part to about nine (9) parts of polyamine and/or polyacrylamine, and/or one part by weight of said polyarylamine and about two (2) to nine (9) parts of weight of said aminoplast resins and/or cationic aminoplast resins.

The inorganic-organic alloys adduct and/or organic alloy adducts (co)polymers which may be employed described above in this application are also suitable polyamine and/or polyacrylamide and/or cationic, anionic, nonionic that can vary from 2 to fifty (50%) percent by weight in combination, for instance with melamine-formaldehyde; melamine-formaldehyde-glyoxal; melamine-formaldehyde, alkyl ether melamine-formaldehyde and/or alkyl ether melamine-formaldehyde- inorganic or organic acids protonized, melamine-urea-formaldehyde inorganic or organic acids protonized, methylol-amino-epihalohydrin resinous products, and/or a mixture thereof.

Component D+:

D+ is from 1% to 95% and preferably 2% to 50% and most preferably 2% to 10% by weight of the total alloy composition, and is selected from the group comprising aqueous solutions of the (co)polymers acrylamide and/or acrylates quaternary ammonium compounds and aqueous and/or latex form of ethylenically unsaturated (co)

polymerizable compounds, polydadmac, polydadmac amphoteric (co)polymers, polydadmac melamine formaldehyde alloy, melamine-formaldehyde-(co)polyacrylamide and its cationic (co)polymers, melamine-formaldehyde colloidal and resins types, urea-melamine-formaldehyde (co) polymers and its alloy with (co) polyacrylamide derivatives and cationic type derivatives, melamine-dicyandiamide-formaldehyde melamine-glyoxal and/or melamine-glyoxal-formaldehyde melamine-dicyandiamide formaldehyde-(co) polymers acrylamide and its cationic and nonionic derivatives, dicyandiamide-formaldehyde-alkylamine and/or polyalkylamine and/or dialkylamine derivatives-co-polyacylamide and its cationic and nonionic derivatives, polyvinyl and unsaturable emulsion (co)polymers, melamine-formaldehyde and/or polyalkyl and/or aryl/ aldehyde and/or their (co)polymers with unsaturated (co) polymerizable compounds, condensation reaction from about 1.75 to about 6 moles of formaldehyde and/or polyalkyl/or aryl polyaldehydes may be employed for each mole of melamine, in particular, alkali metal salts of sulfurous acid which is utilized in the process is so chosen that from about 0.25 to 2.5 moles of bisulfite (—$HSO_3$) or sulfite (—$SO_3$) for each mole of melamine, urea-formaldehyde and urea-formaldehyde-alkylamine and/or polyalkylamine (co) polymers, modified urea-formaldehyde resin having incorporated water-soluble product of reaction of (1) dicyandiamide with (2) the product of reaction under acid conditions, of formaldehyde and/or amine selected from the class consisting of primary aromatic monoamines and secondary monoamines having at least one monovalent aromatic radical, that is at least one aryl radical, atached to the primary and secondary monoamines having at least two of its ortho and para positions unsubstituted, alkyleneamine and/or polyalkyleneamine and/or polyamine condensated with epichlorohydrin and/or its (co)polymers with polyacrylamide derivative cationic and/or nonionic compounds, terpolymers or polymers of diallyldimethyl/or diethylammonium chloride/or sulfate with N-vinyl-2-pyrrolidone (co) poly-acrylamide-(co)polymers as nonionic, anionic and cationic types having a molecular weight range from low (1000) to very high (up to 25 million) and rosin soap products.

It must be mentioned that the glyoxal solution has a glyoxal (CHO—CHO) content which varies between 65 and 85% by weight, and the remaining portion is glyoxal hydrate, having the formula:

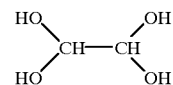

Certain complicated competitive reactions take place, but not to be ingnored is the competitive reaction of glyoxal and glyoxal hydrate, formaldehyde with melamine under acid conditions. The water soluble melamine resin contains the following macromolecule, represented at the end of the reaction by the formula:

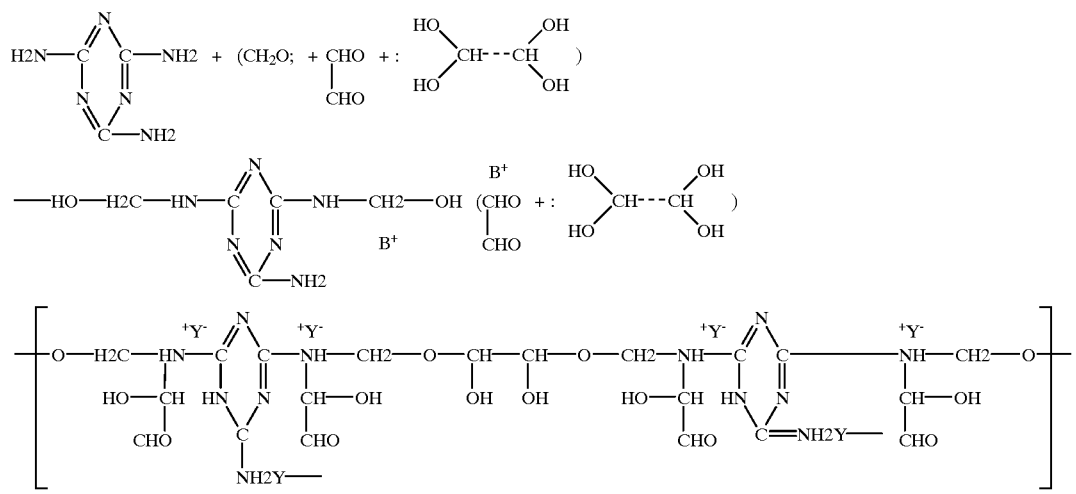

where Y— is the acid radical anion inorganic and/or organic such as: Cl—, $H_2PO4$—, $½SO_4$—2, $HCO_2$—, $CH_3COO$—, $NO_3$—, lactic, propionic, butyric and glycolic. In such acidic reaction conditions, the protonization triazinic ring and izomerization reaction is also possible.

The inorganic-organic alloy polymers and the organic alloy (co)polymers may be produced by the reaction from room temperature (RT) to 175° C. at normal pressure from 0.2 to 25 kg/cm² of A, B+, D+.

Coagulation performance is determined by the turbidity test described in ASTM D.2035-68.

The invented products, processes and their application along with relevant data are presented below. It will be understood that these examples are not intended to limit the invention, but as examples of the operation of the invention.

EXAMPLE NO. 1

A 2000 ml resin kettle flask was equipped with condenser, a mechanical stirrer, a thermometer and an additional funnel. to the flask was charged 350 g of polyhydroxyaluminum-agnesium sulfate, and under moderate agitation was heated to 50–60° when 8.75 g of powdered (pwd) or 2.5% bw of quaternized polyacrylamide (co)polymer with very high molecular weight (15 million) and 50% cationic charge was added.

The composition was mixed for 15 minutes, then 15 g of propylene/or ethylene glycol was added, and then heated to 90–110° C. where the reaction was continued for 2 to 4 hours. After 1 hour of reaction an additional 10 g of propylene/or ethylene glycol was added. After 2 hours of reaction, that adduct alloy polymer was cooled down to 40° to 50° C. and drawn off. The resulting product had:

pH=2.56

Specific Gravity=1.308 g/cc

Viscosity=2250 cps (sp. #4=60 rpm)

EXAMPLE NO. 2

The reactor of Example No. 1 is charged with 350 g of polyhydroxy aluminumagnesium sulfate and heated to 65° when 7.0 (pwd) or 2% bw of polyacrylamide (co)polymer (high cationic charged and 8 million molecular weight) is slowly dispersed. After 5 minutes mixing, the reactor is heated to 90–100° C. and continues mixing for 30 to 180 minutes. The product is cooled down to 30–35° C., and drawn off. It will be a transparent to semi transparent adduct alloy polymer, having:

pH=2.28

Sp. Gravity=1.327 g/ml

Viscosity=1200 cps (spd. #4, 60 rpm)

To the 200 g. of the product is added 1% bw of very fine powder activated carbon and mixed well for 30 minutes. The product, Example 2A, has:

pH=2.42

Sp. Gravity=1.288 g/ml

Viscosity=1050 cps

EXAMPLE NO. 3

The conditions of Example Number 2 are repeated by charging the reactor with 350 g of aluminum sulfate (8.2% $Al_2O_3$) and under moderate agitation is heated to 50–60° C., when 7.0 g of polyacrylamide (pwd) quaternized with very high molecular weight is added. After 10 minutes of mixing the composition is heated to 90–110° C. and reacted for 2–4 hours and then cooled down to 40–45° C. 12.05 g of a surfactant mixture of sodium laurylsulfate (122.2%), phosphated polyether alcohol (12.2%) and dodecylbenzene sulfonic acid (12.2%) is added to the reactor in the weight ratio of inorganic alloy to surfactant of 29.05—1.00. By agitation the product is cooled down to room temperature (RT), and drawn off. A semi-transparent adduct alloy polymer is formed, having:

pH=2.72

Sp. Gravity=1.232 g/ml

Viscosity=700 cps (spd. #4, at 60 rpm)

EXAMPLE NO. 3A

To the reactor described in Example 1 is charged 369.6 gms of polyhydroxyaluminum chloride (PAC)*** followed by 145 gms of an aluminum complex having isomeromorphism, Al/Cl(1.98:1.00), and 672 gms of ionized water. After 10 minutes mixing at room temperature (RT), there is added 1.5 gms of copolymer acrylamide-methacrylate quaternized with cationic charge with a molecular weight (MW) from 1.0 million to 15 million, preferably 5 million. The agitation is continued for 120 minutes when a clear to slightly blue tinted collodial adduct solution is formed having the following properties:

- pH=3.66 (function of PAC used may vary from 2.5 to 4.3)
- Sp. Gravity=1.19 g/ml (regular can vary from 1.15 to 1.25 g/ml)
- Viscosity=50 cps (regular can vary from 30 to 500 cps on spindle no. 4 at 60 RPM, function of MW of of cationic charge of copolymer used)

***See U.S. Pat. No. 4,566,986 to Waldmann. Complex adduct of Example 3A $90_p$ to $95_p$ with melamine glyoxal ($5_p$ to $10_p$ b.w.) quaternized with methyl sulfate or chloride protonized with can be formed by mixing from 15 to 30 minutes.

EXAMPLE NO. 4

The conditions of Example 3 are repeated by substituting the surfactant mixture with 10% by weight of long chain alcohol ethoxylate $(EO)_{1-5}$ sulfonated which is added to the reactor under agitation. The weight ratio inorganic alloy to surfactant is 13.34:1.0. A semi-transparent alloy polymer is formed with:

pH=3.35

Sp. Gravity=1.202 g/ml

Viscosity=350 cps (spd. #4 at 60 rpm)

EXAMPLE NO. 5A

The reactor described in Example No. 1 is charged with 350 g of polyhydroxyaluminumagnesium sulfate and heated to 50–60° C. when 8.75 g of polyacrylamide (nonionic with 18 MM molecular weight) pwd. wetted with 58.33 g of dimethyl sulfoxide (DMSO) is added. The composition is continuously mixed for 80 minutes at 90–95° C., 40 g. of deonized $H_2O$ and 38 g of sodium lauryl sulfate in isopropanol-water mixture is added to the reactor at 90–95° C. The reaction is continued for an additional 120 minutes. The product is cooled to 48–50° C. and drawn off as sem opaque adduct alloy polymer, having:

pH=2.96

Sp. Gravity=1.260 g/ml

Viscosity=2950 cps

EXAMPLE NO. 5B 150 g of product of 5A is mixed with 1% activated carbon for 30 minutes to form inorganic activated carbon alloy mixture 5B, having:

pH=2.80

Sp. Gravity=1.240 g/ml

Viscosity=2900 cps

EXAMPLE NO. 5C

To the reactor in Example 1 is charged 800 gms of polydiallyldimethylammonium chloride-acrylamide copolymer in a 50—50 copolymer ratio. Under agitation and room temperature or heat of 70° C. the copolymer is titrated with 200 gms of aluminum chloride of which 10% is added in less than 10 minutes. The temperature is reduced to 50–60° C., and the rest of the aluminum chloride is titrated. The reaction is continued for 60 minutes at room temperature or 50–60° C. if lower viscosity is desired. A white water transparent inorganic-organic product is formed, having 10% concentration alloy polymer for pH measurement.

10% pH at room temperature=3.25 pH at 50–60° C.=2.25

Sp. Gravity at room temperature=1.10 gm/cc

Sp. Gravity at 50–60° C.=1.235 gm/cc

Viscosity at room temperature=5,800 cps. at 60 RPM

Viscosity at 50–60° C.=550 cps. at 60 RPM

EXAMPLE NO. 6

To the reaction described in Example No. 1 is charged:

| 1. 40% Glyoxal | 50.25 g | 0.346 Mole |
| --- | --- | --- |
| 2. Dionized (di) water | 296.75 g | 16.486 Mole |
| 3. Melamine | 43.75 g | 0.347 Mole |
| 4. Formic Acid | 79.5 g | 1.209 Mole |
| 5. 37% Hydrochloric Acid | 18.75 g | 0.190 Mole | and heated from room temperature to 70–86° C. in 90 minutes as follows:

a) Room temperature to 70° C. in 20 minutes
b) Hold at 70° C. to 85° C. for 60 minutes
c) Cool from 70° C.–85° C. to room temperature in 20–30 minutes. A cationic resin called (MGH) is obtained, having:
pH=2.12 to 2.25
Sp. Gravity=1.075 to 1.100 g/ml
solids=20% to 25%

EXAMPLE NO. 6A

To the reactor described in Example No. 6 is charged 826.5 g of the inorganic-organic alloy polymers described in Example No. 2. Under agitation, for 10 to 12 minutes, is added 174.6 g of the melamine resin (MGH) described in Enample No. 6. After 15 minutes of mixing, a semi-transparent, complex adduct is formed, having:
pH=1.85
Sp. Gravity=1.246 g/ml
Viscosity=500 cps

EXAMPLE NO. 7

To the reactor described in Example No. 6 is charged:

| 1. 40% Glyoxal | 36.23 g | 0.249 Mole |
| --- | --- | --- |
| 2. di Water | 296.76 g | 16.486 Mole |
| 3. Melamine | 31.50 g | 0.250 Mole |
| 4. 37% Formaldehyde | 81.2 g | 1.00 Mole |
| 5. Sulfuric acid (98%) | 19.50 g | 0.200 Mole |

After any required pH adjustment, the mixture is heated from room temperature to 70–85° C. for 12 minutes, then cooled to 50° C. when 261 g of dionized or distilled water is added. The product is filtered off from any undissolved residue and drawn off as a cationic resin (called MGS), having:
pH=0.90
Sp. Gravity: 1.078 g/ml
Solids: 17% b.w.

EXAMPLE NO. 7A

To the 666.7 g of ferric sulfate hydrate aqueous solution under agitation is added 333.3 g of the resin described in Example No. 7. After mixing about 20 minutes, a light brown inorganic-organic adduct complex polymer is formed (called GFMS-Example No. 7A), having:
pH=1.50
Sp. Gravity: 1.352 g/ml (low viscosity)

EXAMPLE NO. 7B

To the 320 g of aluminum sulfate aqueous solution under agitation is added 80.0 grams of the resin described in Example No. 7. After mixing about 20 minutes a light yellow inorganic-organic adduct complex polymer is formed (called GFMS-Example No. 7B), having:
pH=1.50
Sp. Gravity: 1.2540 g/ml

EXAMPLE NO. 8

The conditions of Example No. 7 are repeated by substituting the sulfuric acid with a mixture of 9.75 g of 37.5% HCl (0.098 Mole) and 9.75 g of 98% $H_2SO_4$ (0.097 Mole). After 30 minutes of reaction, a tint blue colloidal cationic resin (called MGHCS) is formed and 0.1% b.w. of bis-guanidine carbonate is added. The product is cooled down and drawn off, having:
pH=1.32
Sp. Gravity 1.72 g/ml
Solids=14% b.w.

EXAMPLE NO. 9

The conditions of Example No. 7 are repeated by substituting the sulfuric acid with 46.12 g (0.401 Mole) of 85% phosphoric acid. After 60 minutes reaction time, a colloidal tint yellow blue resin is formed (called MGHP) with:
pH=2.73
Sp. Gravity=1.080 g/ml
Solids=18% bw

EXAMPLE NO. 9A

To the 341.20 g of melamine resin (MGHP) of Example No. 9 is added 658.80 g of 3% aqueous polyacrylamide medium cationic charged and having 9 million molecular weight. After 20 minutes mixing, a tint blue organic-adduct complex alloy is formed with:
pH=2.68
Sp. Gravity=1.027 g/ml
Viscosity=375 cps

EXAMPLE NO. 9B 333.3 g of melamine resin (MGHP) described in Example No. 9 is reacted with 40% aqueous ferric sulfate (deep dark brown color). After 15 minutes reaction an inorganic-organic adduct complex polymer is formed having light brownish to chocolate creamy color with:
pH=1.65
Sp. Gravity=1.340 g/ml
Viscosity=less than 15 cps

EXAMPLE NO. 10

For more detail of compositions, see U.S. patent Application Ser. No. 749,343 and 842,515.

A 3000 ml. pressure kettle glass reactor equipped with cooling system, temperature control and mechanical agitation, is charged with:

| 1. 37% Formaldehyde | 161.02 g | 1.983 Moles |
| --- | --- | --- |
| 2. di Water | 36.19 g | 2.011 Moles |
| 3. Dicyandiamide | 84.42 g | 1.005 Moles |
| 4. Ammonium chloride | 53.49 g | 1.00 Moles |

5. The reactor is charged with formaldehyde and ice water. Mix for 15 to 20 minutes.

6. Charge the Dicyandiamide. The reation is endothermic. Mix for 15 to 20 minutes.
7. Charge the ammonium chloride in about 5 minutes. The reaction is still endothermic, the temperature dropping to about 8° C.
8. Close the reactor.
9. Let the exotherm go no higher than 70–80° C. In about 20–30 minutes the temperature rose to 30° C. and pressure was 0.2 Kg/cm².
10. The exotherm rose to 62° C. in another 30 minutes and the pressure was 1.2 Kg/cm².
11. Start cooling the reactor and hold the exotherm not higher than 75° C.
12. The temperature of 73° C. was reached in about 30 minutes and the pressure was 24.74 Kg/cm².
13. Hold the reaction at less than 75° C. for 40 minutes.
14. Release the pressure at 0.35 Kg/cm² and close the valve.
15. Heat slowly to 80–85° C. and hold the reaction for 120 minutes. The pressure went as high as 1.2 Kg/cm².
16. Cool to 25–30° C.
17. Release the pressure and draw off the product with:
   pH=3.0
   Sp. Gravity=1.200 g/ml
   Viscosity=130 cps
   Solids=53%
   Appearance=water color The product was stable more than one year. The sample product diluted to 50% solids and 100 cps viscosity was stable over 1.5 years.

EXAMPLE NO. 10A

During a 10 minute period of time, to the 934.4 g of the product (Example No. 10) is added 56.6 g of the product of Example No. 6 (MGH). Agitation is continued for 25 minutes when deep blue organic adduct-polymer complex (called Example No. 10A) is formed with:
   pH=4.42
   Sp. Gravity=1.155 g/ml
   Viscosity=125 cps

EXAMPLE NO. 11

To the reactor described in Example No. 1 is charged:

| a) Cyanoguanidine | 2.16 Moles |
| b) Melamine | 0.249 Moles |
| c) Formaldehyde . . . (37%) | 7.365 Moles |
| d) Methanol | 1.620 Moles |
| e) Formic Acid (conc) | 0.651 Moles | and heated slowly to 85–90° C. and refluxed at 88–90° C. for 60 minutes. 1.80 Moles of urea is added and refluxed at 85–90° C. for 12 minutes, then cooled to 40–45° C., 3.57 Moles of methanol is added, and the product cooled to room temperature, forming a resin of light tint blue, with:
   pH=6.30
   Sp. Gravity=1.146 g/ml
   Viscosity=70 cps
   Solids=43%

EXAMPLE NO. 11A 91.6 g of resin 11 is reacted in 20 minutes with 908.40 g of melamine resin (MGHP) of Example No. 9 to form deep blue colloidal organic-adduct complex polymer called Example No. 11A, having:
   pH=2.34
   Sp. Gravity=1.087 g/ml
   Viscosity=less than 30 cps

EXAMPLE NO. 12

To the reactor described in Example No. 11 is charged:

| a) 40% Glyoxal | 87.43 g | 0.603 Moles |
| b) 37% Formaldehyde | 164.13 g | 2.020 Moles |
| c) Melamine | 76.13 g | 0.604 Moles |
| d) 37% HCl | 32.63 g | 0.331 Moles |
| e) di Water | 516.00 g | 28.685 Moles | after any pH adjustment, the reagents are heated for 36 minutes to 70° C., then held for 50 minutes at 70–80° C. when tint blue colloidal resin polymeric is formed. The reactor is cooled down to 55° C. in 10 minutes (or less) and 454 (21.950 Moles) of di water is added and the product (called MGHC), is drawn off having:
   pH=3.56
   Sp. Gravity=1.042 g/ml
   Solids=8% b.w.

EXAMPLE NO. 12A

To the 786.9 g of the product of Example No. 10 is added 57.3 g of the product MGHC, and then agitation is continued for 30 minutes when the guanidine organic-adduct complex polymeric product is formed (called GFMCG) with a blue transparent color, having:
   pH=4.42
   Sp. Gravity=1.155 g/ml The product can be diluted with di-water, preferable up to 15.57% without any precipitation or separation. The product is called Example No.12A.

EXAMPLE NO. 12B

To the 136.48 g of the product Example No. 12 is added 263.52 g polyacrylamide medium cationic charged, having 8 million molecular weight. After 30 minutes of the reaction, an organic adduct complex polymer is formed (called GFM-CPAM Example No. 12B), having:
   pH=3.34
   Viscosity=1500 cps
   Appearance: yellow tint color Suggestion of Hydrophobe Alkaline Agents manufacture:

EXAMPLE NO. 13

To the reactor described in Example No. 1, or a closed mechanical chemical resistant mixer, is charged:

| 1. Sodium hydroxide (30–35% b.w.) | 81.43% b.w. |
| 2. Anionic surfactant (like a long chain C 12 alkyl sulfated sodium salt) | 7.14% b.w. |
| 3. (co)polystyrene latex | 11.43% b.w. |

The reagents are mixed well for 15–30 minutes or until a uniform product is formed. The semi to creamy white product is drawn off, having:
   pH≧11.5

Sp. Gravity=1.283 g/ml

EXAMPLE NO. 14

Example No. 13 is repeated by using:

| | | |
|---|---|---|
| 1. 35% sodium hydroxide | 87.06% bw | 65.5% |
| 2. Anionic Surfactant (as in Example No. 13) | 5.88% bw | 2.4% |
| 3. (co)Polystyrene acrylic latex | 9.41% bw | 9.2% |
| 4. Aprotic solvents and/or mixture of these and/or water (preferable Dimethyl sulfoxide) | 17.65% bw | 22.9% | and mixed very well for 30 minutes when white fluid latex is drawn off with:

pH≧over 11.5

Sp. Gravity=1.269 g/mL

EXAMPLE NO. 15

Example No. 14 is repeated by substituting the surfactant with anionic type such as alkyl aryl sulfonate sodium salt like dodecyl phenoxy benzene disulfonate sodium salt. The composition is mixed very well for 30 minutes when the fluid chocolate creamy product is drawn off with:

pH≧11.5

Sp. Gravity=1.277 g/ml

EXAMPLE NO. 16

The conditions of Example No. 15 are repeated by substituting the dimethyl sulfoxide with alkaline organic striper based on aprotic solvent mixture like N-methyl pyrrolidone and high boiling point solvent, etc. (See U.S. patent application Ser. No. 42,209, Example No. 5, or U.S. Pat. No. 4,120,810, Example No. 1. After 40 minutes of mixing, a creamy fluid product is drawn off with:

pH≧10

Sp. Gravity=1.267 g/ml

EXAMPLE NO. 17

To the equipment described in Example No. 13 is charged:

| | |
|---|---|
| 1. Water | 54.35% b.w. |
| 2. Sodium gluconate | 0.694% b.w. |
| 3. KOH | 17.19% b.w. |
| 4. Alkyl glucoside ethoxylate (surfactant) | 0.694% b.w. |
| 5. Aluminate (salt and/or polymeric) | 26.54% b.w. |
| 6. Silicon (defoamer) | 0.514% b.w. |

The composition is mixed for 15 minutes when a light brown color product is formed and drawn off, having:

pH≧10.00

Sp. Gravity=1.295 g/ml

Solids=50%

EXAMPLE NO. 17A

To the 267 grams of Example No. 17 is added over a 10 minute period, 27 grams of (co)polystyrene-acrylic latex and mixing is continued for an additional 15 minutes or until uniform emulsion is formed. The product is drawn off, having:

pH≧10.50

Sp. Gravity=1.313 g/ml

Solids=56% b.w.

EXAMPLE NO. 18

To the equipment described in Example No. 13 is charged:

| | |
|---|---|
| 1. Water | 73.0% b.w. |
| 2. Sodium hydroxide (30% b.w.) | 4% b.w. |
| 3. Sodium metasilicate × 5H$_2$O | 1% b.w. |
| 4. Trisodiumsilicate | 0.2% b.w. |
| 5. Sodium rosinate (soap) | 2.0% b.w. |
| 6. (Co)polystyrene-acrylic latex | 20.60% b.w. |
| 7. Silicon (defoamer) | 0.2% b.w. |

The composition is mixed until clear or for 15 minutes when a light chocolate brown color product is formed and drawn off having:

pH≧10.50

Sp. Gravity=1.020 g/ml

Solids=17%

To further exemplify and demonstrate the improved characteristics of the new flocculating material of this invention, numerous tests were conducted. These tests and their results are illustrated in the Table below. Water used to wash the air in paint or lacquer spray in order to remove over-sprayed paint or spray booth lacquer is treated with the following detackifier compositions in acidic or alkaline media and conditions:

| WATER IS TREATED WITH PRODUCTS FROM pH 6.0 TO 9.0: FILTER THROUGH LABOR POROSITY PAPER | | | | | | | |
|---|---|---|---|---|---|---|---|
| Product used (min) | Water (min) | Paint (min) | Alkaline course | Flocculating agent (type, mls) | Detach 1 floation grade | Water clarity (Gardner goals) | Observation |
| Example 46* (4.2) | 200 | 3(CCP) | Example 13 (2) | Example 6A (Comp. 0.8) | 1(K) | 0 | F.D.R. |
| Example 9A (4.5) MAXICHEM-1DTM 1% b. w.(3.4) | 200 | 3(CCP) | Example 14 (2) | Maxifloc-8503(C) 1% b. w.(3) | 1(K) | 0 | F.D.R. |

-continued

WATER IS TREATED WITH PRODUCTS FROM pH 6.0 TO 9.0: FILTER THROUGH LABOR POROSITY PAPER

| Product used (min) | Water (min) | Paint (min) | Alkaline course | Flocculating agent (type, mls) | Detach 1 floation grade | Water clarity (Gardner goals) | Observation |
|---|---|---|---|---|---|---|---|
| Example 6A (2.7) Maxichem-1DTM (10) or -964 | 200 | 3(CCP) | Example 15 (2) | Maxifloc-8503 (C) 1% b. w.(9.0) | 1(K) | 0 | F to V.F.D.R. |
| Example 6A (2.7) Maxichem-957* (10) | 200 | 3(CCP) | Example 15 (2) | Example 2A (C); (0.5) | 1(K) | 0 | F.D.R. |
| Magnafloc-509C (8) | 200 | 3(CCP) | Sodium silicate/ sodium metasilicate (1:1) maturate solution (12) | Maxifloc-8503 (C) 1% b. w.(5) | 97–98%(K) | 0 to 1 | S.D.R. |
| Example 6A (2) | 200 | 3(CCP) | Example 15 (2) | Example 2A (C) (2) | 1(K) | 0 | V.F.D.R. |
| Example 9 (2) Example 9B (2) | 200 | 3(CC) | Example 15 (2) | Percol-1011(%) 15 b. w.(5) | 1(K) | 0 | V.F.D.R. |
| Example 11B (4.8) Maxichem-1DTM (2.8) | 200 | 3(CC) | Example 16 (2) | Maxifloc-8503 (C) 15 b. w.(1) | 1(K) | 0 | F.D.R. |
| Example 1 (3) | 200 | 3(CC) | Maxifloc-8010 (sodium- aluminate: 1.9) | Maxifloc-8503 (C) 3% b. w.(1) | 1(K) | 0 | F.D.R. |
| Example 9 (9) | 200 | 3(CCP) | 2% Sodium re- sinate sili- cate mixture (10) | Maxifloc-8503 (C) 1% b. w.(10) | 1(K) | 0 | M to F.D.R. |
| Example 6B | 200 | 2(CC) | Example 18 | Maxifloc-8503 | 1(K) | 0 | V.F.D.R. |
| Example 7A (2) | 200 | 2(CC) | Example 17(2) | Example 12M (2) | 1(K) | 0 | F.D.R. |
| Example 7M (2) | 200 | 2(CC) | Example 11 | Example 12B (0.3) | 1(K) | 0 | F.D.R. |
| Example 9A (0.4) | 200 | 2(CC) | Maxichem-122.4(5) | Maxifloc-8053 (0.8) | 1(K) | 0 | V.F.D.R. |
| Aloe-liquid 48% (2) | 200 | 2(CC) | 20% b. w. Na$_2$CO$_3$ (10) | Percol-1011(A) 1% b. w.(6) Maxifloc-8503(C) 1% b. w.(1) | 2(70–75%K) | 0 to 1 | H to F.D.R. |
| Ferric Sulfate hydrate (2) | 200 | 2(CC) | 20% b. w. Na$_2$CO$_3$ (8) | Percol-1011(A) 1% b. w. (1) Maxifloc-8503(C) 1% b. w.(0.5) | 2(75–80%K) | 2 | M.D.R. |
| ChlorhydroiTH-50 (Polyaluminum chloride: 2mls) | 200 | 2(CC) | 20% b. w. Na$_2$CO$_3$ (1.9) | Percol-1011(A) Maxifloc-8503(C) 1% b. w.(3),(2) | 2(85–90%K) | 0 to 1 | S.D.R. |
| Example 7A GFHS:2) Example 12 (GFMCG:2) | 200 | 2(CC) | Example 14 (2) | Maxifloc-8503(C) 3% b. w.(0.5) | 1(K) | 0 | F to V.F.D.R. |
| Example 2** (3) | 200 | 3(CCP) | 20% b. w. Na$_2$CO$_3$ to pH 10 | Percol-1011(A) 1% b. w.(3) | 2(95–99%K) | 0 to 1 | M.D.R. alkaline water and sludge: by zinc present not disposable |
| Example 3A (3) | 200 | 3(CCP) | Maxifloc 8010 | Maxifloc 8503(C) 3% by wt.(1)$_{/ov}$ Maxifloc 8562 A 0.5% by wt.(1) | 1(K) | 0 | F.D.R. low sludge volume |
| Example 3A MGMS (1 to 1)(3) mixture | 200 | 3(CCP) | Ex. 17 | Maxifloc 8562(A) 0.5% by wt.(2) | 1(K) | 0 | V.F.D.R. low sludge volume |
| Example 3A MGMS (1:1)(3) mixture | 200 | 3(CCP) | 30% NOH | Maxifloc 8503 3% b. wt.(1.5) | 1(K) | 0 | V.F.D.R. medium sludge volume |
| Example 2(2) | 200 | 3(CCP) | Maxifloc 8010 (0.5) | Maxifloc 8503(C) 3% b. w.(1) | 1(K) | 0 | V.F.D.R. low sludge volume |

-continued

WATER IS TREATED WITH PRODUCTS FROM pH 6.0 TO 9.0: FILTER THROUGH LABOR POROSITY PAPER

| Product used (min) | Water (min) | Paint (min) | Alkaline course | Flocculating agent (type, mls) | Detach 1 floation grade | Water clarity (Gardner goals) | Observation |
|---|---|---|---|---|---|---|---|

OBSERVATIONS:
*See U.S. Pat. application No. 842,515 (March 21, 1986)
**Nalco Chemical Co. U.S. Pat. No. 4,067,806
MAGNAFLOC is a trademark of American Cyanamid Co.
MAXIFLOC is a trademark of Maxichem Inc.
PERCOL is a trademark - Allied Colloids Inc.
M.D.R. = Medium dewatering rate
S.D.R. = Slow dewatering rate
F to VF = Fast to very fast dewatering rate
K = Paint killed
MAXICHEM-1DTM = Polymelamine formaldehyde condensate
MAXICHEM-957 = modified polymelamine condensate (glyoxal type)
MAXICHEM-964 = polymelamine formaldehyde condensate protonized
MAGNAFLOC-509C = Polymelamine formaldehyde condensate;
(C) = Cationic type
(A) = Anionic type
(N) = Nonionic type
Detackification grades are arbitrarily defined as:
1. Very good (killed);
2. Good;
3. Fair;
4. Poor
5. Unacceptable
The water supernatant is expressed in Garner Color Scale and is:
0 - water color (clear)
1 - white
2 - slight yellow
3 - yellow
4 - brownish yellow
5 - brown
6 - dark brown
7 - dark, blackish color

What is claimed is:

1. A method for the detackification of oversprayed paint in a paint spray operation wherein said oversprayed paint comes into contact with water from a waste water system, the method comprising:
   dosing the water from the waste water system within an effective detackifying amount of a composition comprising:
   a polymer consisting essentially of:
      from about 10 to about 50 mole percent cationic mer units, the cationic mer units being selected from the group consisting of dimethylaminoethylmethacrylate sulfuric acid salt, dimethylaminoethylmethacrylate methylchloride quaternary salt or mixtures thereof;
      from about 1 to about 10 mole percent ethylenically unsaturated anionic mer units; and
      from about 40 to about 89 mole percent acrylamide mer units,
   wherein the polymer has an intrinsic viscosity of from about 1.2 to about 3.8; and
   from about 0.2 to about 10.0 parts by weight of aluminum sulfate as the octadecahydrate for each part by weight of the polymer.

2. A method for the detackification of oversprayed paint in a paint spray operation wherein said oversprayed paint comes into contact with water of a waste water system, comprising:
   dosing said water of said waste water system with composition comprising a polymer and aluminum sulfate, said polymer consisting essentially from about 10 to about 50 mole percent of cationic mer units of monoethylenically unsaturated monomer, selected from a dimethylaminoethylmethacrylate sulfuric acid salt, and from about 50 to about 90 mole percent of (meth) acrylamide mer units,
   said polymer having an intrinsic viscosity of from about 1.2 to about 4.0
   said composition containing from about 0.2 to about 10.0 parts by weight of aluminum sulfate as the octadecahydrate for each part by weight of said polymer,
   wherein said composition is present in said water of said waste water system in sufficient amount to detackify oversprayed paint when said oversprayed paint comes into contact with said water.

3. A method for detackification of paint and removal of residual paint and metals present in spray paint booth water comprising adding to said water an effective amount of an inorganic-organic adduct alloy polymer composition having the formula $$(A)_r\text{—}(B+)_x\text{—}(D+)_w$$

wherein:
A is an inorganic material represented by the formula:
$A=\{(SiO_2/Me^I_2O)_u Me_m^{II} Me_n^{III}(OH)_p(SO_4)_y(Aci)_{(2m+3)-p-2y}\}_r$
where: u is 0 to 10% by weight, r is 1 to 99% by weight $(SiO_2/Me_2^IO)$, ratio is 1.5 to 3.5 and $Me^I$=Na, K, Li,
$(SiO_2/Me_2^IO)_u$ is a silicate adduct or polymeric form of a compound selected from the group of hydroxy, polyhydroxy and oxy aluminum compound;

$Me_m^{II}$ is selected from the divalent cation group of hydroxy, polyhydroxy aluminum and iron adduct complex consisting of:

Mg, Zn, Ca, and $Fe^{II}$; and m=0 to 5;

$Me_n^{III}$ is a tri-or higher valent metal selected from the group consisting of the adduct of hydroxy, polyhydroxy, and oxy of Al, Fe, and Al-Zr complexes; and n=1 to 20;

Aci is selected from the monovalent anionic group consisting of:

$I^-$, $Cl^-$, $Br^-$, $NO_3^-$, $H_2PO_4^-$, $CH_3COO^-$, $OH^-$ and mixtures thereof;

p=0 to 75; y=0 to 15;

—$(B^+)_x$ is a water soluble cationic polymer selected from the group consisting of protonized or quaternized polymers of melamine-glyoxal, melamine-formaldehyde, melamine-glyoxal-formaldehyde and its copolymer with cyanoguanidine, urea, cationic polyamine selected from the group of epichlorohydrin-dimethylamine polymers or copolymers thereof, $(C_1-C_3)$ alkanol amine protonized by mineral acids or organic acids selected from the group consisting of hydrochloric, sulfuric, phosphoric, nitric, formic, acetic, propionic, glycolic, lactic, citric, glutaric, oxalic and mixtures thereof, and optionally quaternized with a compound selected from the group consisting of methyl halides and $C_1-C_2$ dialkyl sulfates, said polymer having a viscosity average molecular weight of from 200 to 500,000;

and x=0 to 100% by weight, and

—$(D^+)_w$ is a water soluble cationic polymer or (co)polymer selected from the group consisting of homopolymers of cationic monomers selected from the group consisting of (meth)acrylamide, $C_1-C_4$ dialkylamino(meth) acrylate and their quaternized derivatives with methyl halides or $C_1-C_2$ dialkyl sulfates, salts of dialkylamino-(meth)acrylate with acids selected from the group of sulfuric, hydrochloric and phosphoric acids, methacrylamidopropyl trimethyl ammonium salt, N,N,N-trimethylallyl ammonium salts, diallyldimethyl ammonium halide, and copolymers thereof, amphoteric polymers selected from the group consisting of poly (DADMAC), (co)polymers of (DADMAC-acrylamide) in weight ratio of (5%/50), and mixtures thereof, acrylamide-manich (co)polymers, nonionic, anionic and cationic (co)polyacrylamide, blends of cationic (co)polyacrylamide and poly(DADMAC) with water soluble protonized and optionally quaternized polymers of melamine-glyoxal, melamine-formaldehyde, melamine-glyoxal-formaldehyde and (co)polymers with cyanoguanidine, urea, cationic polyamine selected from the group of epichlorohydrin-dimethylamine polymers or copolymers thereof, $C_1-C_3$ alkanol amine, and mixtures thereof, and w=0.2 to 99% by weight with the proviso that A is always positive and at least one of $B^+$ and/or $D^+$ is also positive.

4. A method according to claim 3 wherein the paint detackification is conducted at a pH of from about 2.0 to about 13.5.

5. A method according to claim 3 wherein the pH is adjusted with an inorganic or organic alkaline compound selected from the group consisting of NaOH, KOH, $Ca(OH)_2$, $Na_2CO_3$, sodium aluminate and potassium aluminate, sodium zincate, sodium silicate, sodium meta silicate or their reacted product with aluminum salts, sodium borate, aliphatic amine, $C_1-C_3$ alkanolamines having dissolved therein 1% to 10% bw of NaOH or KOH, and mixtures thereof, and with and without a "Hydrophobe" material selected from the group of anionic, nonionic and cationic surfactants mixed with latices selected from the group of styrene and acrylic latices being added prior or after addition of inorganic-organic or organic adduct.

6. The method according to claim 5 wherein the "Hydrophobe" materials include nonionic and anionic surfactants and mixtures thereof, the above surfactants having combined carbon atoms from $C_5-C_{50}$ in their structure, and from 0.5 to 95% bw, (co)polymers of ethylenicaly unsaturated vinyl monomers selected from the group consisting of styrene latex, styrene-divinylbenzene latex, styrene-butadiene latex, styrene-acrylate latex, acrylic-vinyl halide latex, and natural polymer selected from the group consisting of sodium gluconate, sodium glucoheptonate, bentonite, modified organic bentonites, rosin soaps, and solvents selected from the group consisting of aprotic solvents and organic strippers.

7. The method according to claim 5 wherein the alkaline material, the hydrophobe material, surfactant, organic stripper or aprotic solvents and natural polymer are present respectively in parts by weight from (2.5–5.0 pbw); (1.5–45 pbw); (0.5–15 pbw); (0.0–38 pbw); and (0.0–5.0 pbw).

8. The method according to claim 6 wherein the detackification process is ended at a pH range from about 6.0 to about 9.0.

9. The method of claim 3 wherein the pH is adjusted from about 2.5 to about 12.0.

10. The method of claim 3 wherein the water comprises paint and laquer waste waters.

11. The method of claim 3 wherein the water comprise spray booth water.

12. The method of claim 3 wherein the water contains residual paint and metals.

13. The method of claim 3 wherein from about 1 to about 20 milliliters of said composition per 200 milliliters of water is used.

14. The method according to claim 13 wherein A is aluminum sulfate and $D^+$ is a quaternized acrylamide-(meth) acrylate (co)polymer.

15. A method for the detackification of oversprayed paint in a paint spray operation wherein said oversprayed paint comes into contact with water from a waste water system, the method comprising:

dosing the water from the waste water system within an effective detackifying amount of a composition comprising:

a polymer consisting essentially of: (i) a cationic mer unit selected from the group consisting of dimethylaminoethylmethacrylate sulfuric acid salt, dimethylaminoethylmethacrylate methyl chloride quaternary salt or mixtures thereof; (ii) ethylenically unsaturated anionic mer units; and (iii) (meth)acrylamide mer units wherein the polymer has an intrinsic viscosity of from about 1.2 to about 3.8 or a viscosity average molecular weight in the range of 1000 to 25,000,000; and from about 0.01 parts to about 99 parts by weight or from about 1 to 99% by weight of aluminum sulfate as the octadecahydrate for each part by weight of the polymer.

16. A method for the detackification of oversprayed paint in a paint spray operation wherein said oversprayed paint comes into contact with water of a waste water system, comprising:

dosing said water of said waste water system with a composition comprising a polymer and aluminum sulfate, said polymer consisting essentially of: (i) a cationic mer unit selected from the group consisting of dimethylaminoethylmethacrylate sulfuric acid salt, dimethylaminoethylmethacrylate methyl chloride quaternary salt and (ii) (meth)acrylamide mer units; said polymer having an intrinsic viscosity of from about 1.2 to about 4.0 or a viscosity average molecular weight in the range of 1000 to 25,000,000; said composition containing from about 1 to 99% by weight or from 0.01 parts to about 99 parts by weight of aluminum sulfate as the octadecahydrate for each part by weight of said polymer, wherein said composition is present in said water of said waste water system in sufficient amount to detackify oversprayed paint when said oversprayed paint comes into contact with said water.

* * * * *